United States Patent [19]

Bailey

[11] 3,784,957

[45] Jan. 8, 1974

[54] CONDUCTIVE SHUNT FOR DUAL-IN-LINE TERMINAL INTEGRATED CIRCUIT

[75] Inventor: Richard J. Bailey, Tonawanda, N.Y.

[73] Assignee: GTI Corporation, Tonawanda, N.Y.

[22] Filed: June 29, 1972

[21] Appl. No.: 267,400

[52] U.S. Cl. .................. 339/19, 339/17 CF, 339/36, 206/46 ED, 206/65 F, 317/16

[51] Int. Cl. ............................................ H01r 31/08

[58] Field of Search .................. 339/19, 22 R, 22 B, 339/242, 36, 198 R, 198 J, 198 N, 17 C, 17 CF; 206/46 ED, 56 A, 65 F, 56 DF; 174/DIG. 3, DIG. 5; 317/100, 101, 16

[56] References Cited

UNITED STATES PATENTS

| | | | |
|---|---|---|---|
| 3,638,071 | 1/1972 | Altonen | 317/2 R |
| 3,673,543 | 6/1972 | Garner | 339/61 M |
| 3,622,688 | 11/1971 | Link et al. | 174/142 |
| 3,495,131 | 2/1970 | Melcher | 339/17 CF X |

*Primary Examiner*—Marvin A. Champion
*Assistant Examiner*—Robert A. Hafer
*Attorney*—Joseph Weingarten et al.

[57] ABSTRACT

A shunt for dual-in-line terminal integrated circuits has a channel-shaped body of a conductive elastomer, the upstanding flanges of the channel being provided with a plurality of holes extending therethrough perpendicular to the web.

3 Claims, 2 Drawing Figures

CONDUCTIVE SHUNT FOR DUAL-IN-LINE TERMINAL INTEGRATED CIRCUIT

This invention relates to shunts for semi-conductor devices. It is more particularly concerned with a shunt for a dual-in-line terminal integrated circuit.

One of the drawbacks of metal oxide substrate semiconductors (MOS) is their susceptibility to damage from static electricity charge during handling and shipping. A standard precaution to prevent this is to short circuit all the leads while the device is being handled. The dual-in-line (DIL) integrated circuit package with which this invention is concerned has relatively short stiff flat leads extending from each side of a flat wafer and bent at right angles in the same direction. These leads are narrower at their contact ends than at their point of emergence from the wafer; their edges taper from the wafer to an intermediate point in their length and are parallel from that point to their contact end. The number of such leads currently goes as high as forty. These integrated circuits are packed and shipped in large volume. Most users wish to have the leads protected during shipment so that they will not arrive bent or twisted. However, the user of the devices generally tests them after receipt and, of course, must remove the short circuit to do so. It is not commercially feasible to connect and disconnect the leads individually.

It is an object of my invention, therefore, to provide a conductive shunt or short circuiting device which can be rapidly applied to a multi-lead DIL integrated circuit and removed therefrom. It is another object to provide such a device which prevents lead deformation. It is another object to provide such a device which also serves as a shipping carrier. It is another object to provide a one-piece device of the character above described. It is still another object to provide such a device which may be molded from an elastomer. Other objects will appear in the course of the description of my invention which follows.

An embodiment of my invention presently preferred by me is illustrated in the attached figures to which reference is now made.

Figure 1:
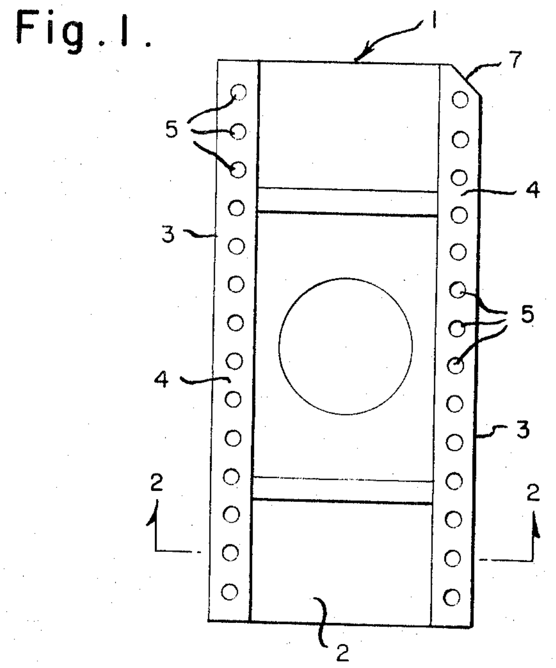
FIG. 1 is a plan of the article of my invention.
Figure 2:
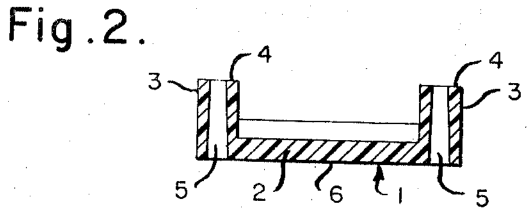
FIG. 2 is a cross section of the article of FIG. 1 taken on the plane 2-2 of FIG. 1.

The figures illustrate a conductive shunt of my invention adapted for use with a wafer integrated circuit having up to 28 contacts in dual-in-line arrangement. My article has a channel-shaped body 1 comprising a web portion 2 having an exterior face 6 and parallel upstanding flanges 3 along each side thereof. Each flange 3 has a flat end surface 4. Each flange is provided with a plurality of holes 5 extending inwardly from end surface 4 through the flange, the holes 5 being spaced along the length of the flange 3 so as to mate with the contacts of a dual-in-line integrated circuit package. I prefer to taper the holes slightly, as is shown in FIG. 2, so that their diameter in face 4 of flange 3 is less than their diameter in the exterior face 6 of web 2.

The material from which I prefer to mold my article is polyethylene containing a conductive additive, such as carbon. This material is an elastomer having an appreciable capacity for elongation. The leads of the integrated circuits are inserted into holes 5 of my shunt from face 6 and slightly distend the elastomer so as to make good electrical contact therewith.

One corner 7 of the device is beveled for indexing purposes. Generally the bevel is adjacent the hole for lead 1 of the integrated circuit device.

Shunts as above described fitted with integrated circuits may be loaded into a flat tray for shipment and protect the integrated circuits both mechanically and electrically during shipment and subsequent handling.

In the foregoing specification I have described a presently preferred embodiment of this invention, however, it will be understood that this invention can be otherwise embodied within the scope of the following claims.

I claim:

1. A shunt for the leads of a dual-in-line integrated circuit having a plurality of leads spaced along two parallel sides and bent at right angles in spaced parallel relationship, said shunt comprising:

a substantially flat body; and upstanding flanges integrally formed with said body along either longitudinal edge thereof, said flanges extending from one flat surface a distance beyond the opposite surface of said body which is substantially equal to the distance by which said leads extend beyond the bottom of said integrated circuit thereby forming a channel-shaped device, said flanges having a plurality of holes therein configured to mate with the leads of said integrated circuit;

said body and flanges being formed of a conductive elastomer so that when said shunt is mated with a dual-in-line integrated circuit, the leads make positive contact with said shunt, are maintained at a common potential and are protected from damage during handling and shipment.

2. The shunt of claim 1 in which the holes are convergently tapered away from the web.

3. The shunt of claim 1 in which the elastomer is polyethylene containing a conductive additive.

* * * * *